United States Patent [19]
Hujik

[11] 3,912,437
[45] Oct. 14, 1975

[54] MOLD FILLING INSERT FOR INJECTION MOLDING MACHINE

[75] Inventor: Ladislav Hujik, Batawa, Canada

[73] Assignee: Bata Shoe Company, Inc., Belcamp, Md.

[22] Filed: Oct. 29, 1974

[21] Appl. No.: 518,749

[30] Foreign Application Priority Data
Oct. 29, 1973 Canada .............................. 184546

[52] U.S. Cl. .............. 425/247; 425/129 S; 425/242
[51] Int. Cl.².... B29F 1/06; B29C 11/00; B29H 7/08
[58] Field of Search .... 425/119, 129 S, 130, 242 R, 425/249, 247, 436, 437, 444, 124, 125, 127; 18/345, 42 H, 42 D; 249/66 C, 67, 68, 109, 107

[56] References Cited
UNITED STATES PATENTS

| | | | |
|---|---|---|---|
| 3,109,199 | 11/1963 | Hardy | 425/119 |
| 3,439,384 | 4/1969 | Crossen et al. | 425/129 S X |
| 3,463,849 | 8/1969 | Winkler | 425/129 S X |
| 3,467,985 | 9/1969 | Wessel | 425/119 |
| 3,682,579 | 8/1972 | Hujik | 425/242 R X |
| 3,732,055 | 5/1973 | Hujik | 425/444 X |

Primary Examiner—J. Howard Flint, Jr.
Attorney, Agent, or Firm—Fleit & Jacobson

[57] ABSTRACT

A mold filling insert for use in an injection molding machine in which a heel alone or in combination with the remainder of a shoe sole is molded in a mold cavity defined by a mold having an injection port for injecting moldable material into a heel portion of the mold cavity prevents surface imperfections due to the usual jetting of molding material into the mold cavity. The insert includes a nozzle in the injection port having an injection orifice, which is inclined relative to the path normally followed through the injection port by an acute angle or by 90°.

4 Claims, 3 Drawing Figures

MOLD FILLING INSERT FOR INJECTION MOLDING MACHINE

BACKGROUND OF THE INVENTION

1. Field of the Invention

This invention relates to a device for use in an injection molding machine, and in particular, to a mold filling insert for use in an injection molding apparatus for producing shoe soles.

2. Description of the Prior Art

In the injection molding of shoe soles with thermoplastic material, a mold cavity is formed using a mold top and a mold bottom. In order to reduce production costs when manufacturing a sole including a thick heel, or a thick heel alone, the heel is normally hollow with reinforcing ribs extending between the sides and ends thereof. In order to mold a hollow heel, a heel cleat is used in combination with the mold top and bottom. The heel cleat may be integral with or separate from the mold bottom, and extends into the heel cavity of the top mold. The normal method of injecting thermoplastic material into such a mold is to provide an injection port in the bottom mold which includes a narrow inner end or orifice through which the thermoplastic material is injected into the mold cavity. The use of a restricted orifice in the surface of the bottom mold facilitates removal of the sprue following an injection molding operation, i.e., when the sprue is pulled it breaks at its weakest point, namely at the restricted injection orifice.

When molding soles having a thick heel or thick heels themselves, it has been found that valve lines or sole marks, or smudges often appear on the surface of the heel.

SUMMARY OF THE INVENTION

The object of the present invention is to avoid the above disadvantage of present molding techniques, i.e., to provide a mold filling insert for use in an injection molding machine which results in a relatively high quality finished product substantially free of surface imperfections.

Accordingly, the invention relates to a mold filling insert for use in an injection molding machine, in which a sole is molded in a mold cavity defined by a mold top and a mold bottom, one of said molds having an injection port for introducing thermoplastic material into the mold cavity, said mold filling insert including a nozzle in said injection port. The nozzle includes a passage for conveying thermoplastic material from the injection port into the mold cavity. An injection orifice is provided at the mold cavity end of the passage for introducing material into the mold cavity, the injection orifice being inclined relative to the path which would normally be followed by the thermoplastic material. The term "inclined" is intended to mean that the injection orifice is at an angle to the path which would normally be followed by the thermoplastic material if the insert were not present. The angle can be from slightly more than 0° to 90°. However, an acute angle of, e.g., 60° is preferred.

It has been found that the above-defined inclined injection orifice in a mold filling insert results in heels virtually free of surface imperfections. By providing means for rotating the mold filling insert, the inserts can be adapted to heels of various sizes and shapes. It is necessary to adjust the insert to suit the heel being formed in the mold cavity. However, such adjustment is relatively simple, and can readily be performed by the molding machine operator.

BRIEF DESCRIPTION OF THE DRAWINGS

The invention will now be defined in greater detail with reference to the accompanying drawings, wherein.

DESCRIPTION OF THE PREFERRED EMBODIMENT

Figure 1:
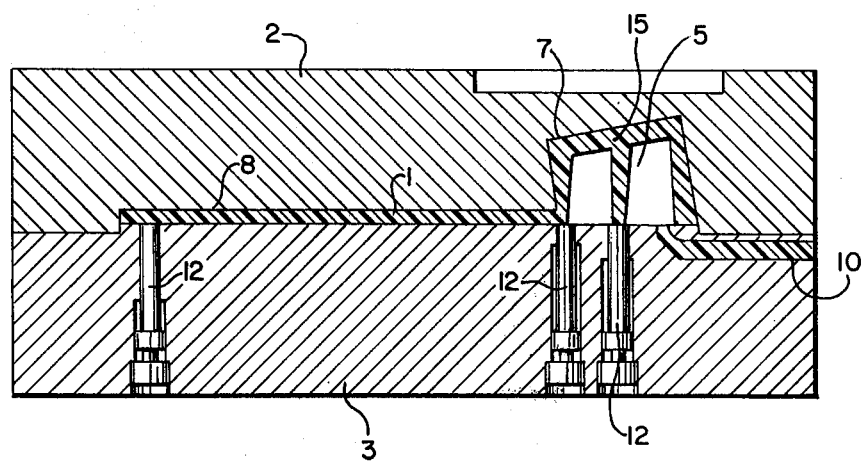
FIG. 1 is a longitudinal sectional view of a conventional mold for use in the injection molding of a shoe sole.

With reference to FIG. 1, a thermoplastic shoe sole 1 is molded in a mold formed by a top mold 2 and a bottom mold 3. A cleat 5 extends upwardly from the bottom mold 3 into a heel cavity 7 in the top mold. Thermoplastic material is injected into a mold cavity 8 defined by the top mold 2, the bottom mold 3 and the heel cleat 5 through an injection port 10.

Upon completion of a molding operation, the top mold 2 is raised, and ejection pins 12 are actuated to eject the finished sole from the mold bottom 3 and the cleat 5. The ejection pins 12 have been included for the purposes of illustration only and, in fact, do not illustrate the type of ejection mechanism presently being used.

As mentioned above, when injecting thermoplastic material into the mold cavity 8, it has been found that imperfections often appear on the finished surfaces of the heel 15 of the shoe sole. Such imperfections are believed to occur as a result of turbulence created by the direct jetting of the thermoplastic material into the heel portion of the mold cavity.

Figure 2:
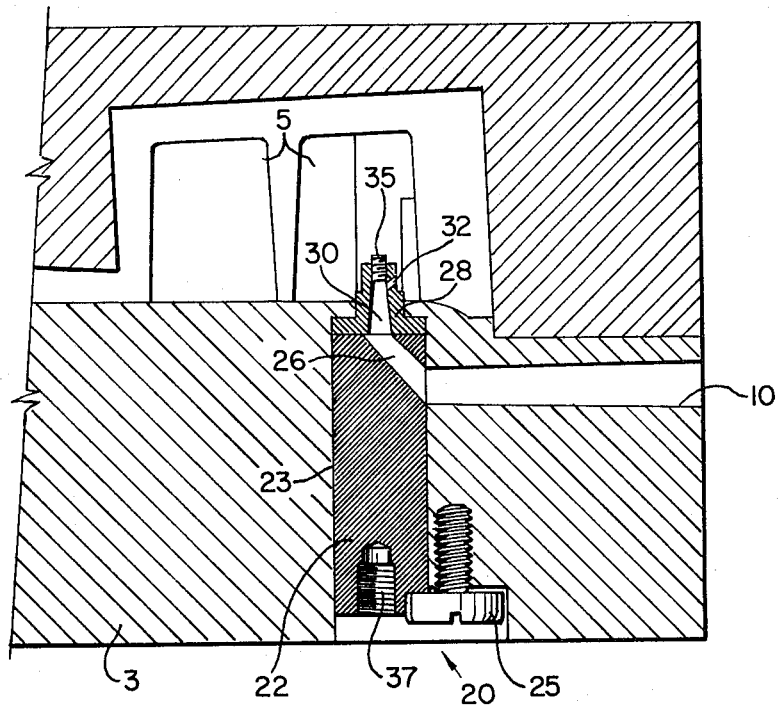
FIG. 2 is a longitudinal sectional view of one end of the mold of FIG. 1, on a somewhat larger scale, incorporating the mold filling insert of the present invention.
Figure 3:
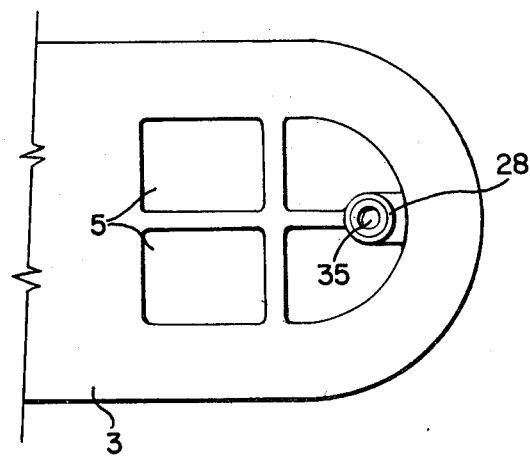
FIG. 3 is a plan view of the heel portion of the bottom mold and cleat of the mold of FIG. 2.

Referring now to FIGS. 2 and 3, it has been found that the occurrence of such imperfections can be avoided by providing a mold filling insert, generally indicated at 20, in the bottom mold 3. The insert 20 includes a cylindrical body 22 held in a hole 23 in the mold bottom by a screw 25. The upper end of the body 22 is provided with an inclined passage 26, which forms a continuation of the injection port 10. A nozzle 28 is mounted on the upper end of the insert 22. A passage 30 through the nozzle 28 provides for fluid communication between the injection port 10 and the mold cavity. The outlet end 32 of the passage 30 defines an injection orifice through which the molding material enters the mold cavity.

In accordance with the present invention, the injection orifice 32 is inclined relative to the usual flow passage 30 of the molding material. By inclined, in this case, is meant that the injection orifice 32 defines an acute or 90° angle with respect to the normal flow passage 30.

A plug 35 in the form of a set screw is provided in the top end of the nozzle 30 for adjusting the injection orifice 32. It is preferable to be able to adjust the size of the injection orifice, particularly when molding two or more soles in the same mold. When molding with two molds, the mold cavities for the soles are side-by-side, and the injection port 10 is Y-shaped, with arms extending to each of the mold cavities. The provision of an injection orifice having an adjustable opening ensures that each mold cavity of a double cavity mold is filled to the same extent.

The bottom end of the insert 22 is provided with a cavity 37 having a hexagonal or other polygonal cross-sectional configuration. In order to adjust the position of the injection orifice 32 in the mold cavity, it is merely necessary to loosen the screw 25, and to rotate the nozzle 28. Two opposing sides of the nozzle 28 may be flattened for receiving a spanner or the like. Thus, the position of the injection orifice can be readily adjusted, without removing the filling insert from the bottom mold. Of course, when a different angle of the injection orifice relative to the usual flow path of the molding material is required, it will be necessary to replace the filling insert with another filling insert. In other words, the angle of inclination of the injection orifice 32 in any one filling insert is not adjustable.

In use, a mold cavity is formed by closing the top and bottom molds 2 and 3, respectively. Molding material is then introduced via the injection port 10, the inclined passage 26 in the insert 22, passage 30 in the nozzle 28 and the injection orifice 32. By examining the finished heel, a decision can be made as to whether to vary either the inclination of the injection orifice 32 or the direction of such orifice in the mold cavity. In many cases, it will merely be necessary to rotate the insert 22 using a key in the cavity 37. In some instances, it will be necessary to replace the insert 22 with a new insert bearing a nozzle having an injection orifice 32 with a different inclination. However, it should always be possible after a short amount of testing to produce a high quality finished product consistently.

I claim:

1. A mold filling insert for use in an injection molding machine in which a shoe heel is molded in a mold cavity defined by a mold having an injection port for injecting moldable material into said mold cavity, said mold filling insert comprising a nozzle contiguous to said injection port having an injection orifice inclined relative to the path normally followed through said injection port by an angle up to 90° to said path, said mold includes a top mold and a bottom mold defining said mold cavity, said insert including a body removably mounted in said mold bottom intersecting said injection port, a flow passage in said body connecting said injection port to said mold cavity, said nozzle mounted on said body projecting into said mold cavity, and a passage in said nozzle defining said injection orifice for feeding moldable material from said flow passage into said mold cavity.

2. A mold filling insert according to claim 1, wherein said injection orifice is inclined by an angle of 60° relative to the path normally followed through said injection port.

3. A mold filling insert according to claim 1, including means for adjusting the size of said injection orifice.

4. A mold filling insert according to claim 1, wherein said removable body is cylindrical.

* * * * *